(12) United States Patent
Iyer et al.

(10) Patent No.: US 9,398,471 B2
(45) Date of Patent: Jul. 19, 2016

(54) IDENTIFYING A WIRELESS COMMUNICATION CHANNEL AND A POWER SETTING FOR USE BY AN ACCESS POINT TO ADVERTISE A PARTICULAR SSID

(75) Inventors: Pradeep Iyer, Cupertino, CA (US); Santashil Palchaudhuri, Kolkata (IN)

(73) Assignee: ARUBA NETWORKS, INC., Sunnyvale, CA (US)

( * ) Notice: Subject to any disclaimer, the term of this patent is extended or adjusted under 35 U.S.C. 154(b) by 1107 days.

(21) Appl. No.: 12/976,722

(22) Filed: Dec. 22, 2010

(65) Prior Publication Data
US 2012/0166519 A1    Jun. 28, 2012

(51) Int. Cl.
*G06F 15/16* (2006.01)
*H04W 24/02* (2009.01)
*H04W 84/20* (2009.01)

(52) U.S. Cl.
CPC .............. *H04W 24/02* (2013.01); *H04W 84/20* (2013.01)

(58) Field of Classification Search
CPC .............................. H04W 24/02; H04W 84/20
USPC .............. 709/203, 220, 227; 455/426.1, 446, 455/434; 370/338
See application file for complete search history.

(56) References Cited

U.S. PATENT DOCUMENTS

| | | | |
|---|---|---|---|
| 2004/0039817 A1* | 2/2004 | Lee et al. | 709/225 |
| 2004/0203762 A1* | 10/2004 | Liu et al. | 455/434 |
| 2006/0073832 A1* | 4/2006 | Pfister | 455/446 |
| 2008/0075051 A1* | 3/2008 | Dundar et al. | 370/338 |
| 2008/0320108 A1* | 12/2008 | Murty et al. | 709/220 |
| 2009/0170472 A1* | 7/2009 | Chapin et al. | 455/410 |
| 2009/0276531 A1* | 11/2009 | Myka et al. | 709/227 |
| 2010/0074238 A1* | 3/2010 | Qian et al. | 370/338 |
| 2010/0303051 A1* | 12/2010 | Umeuchi et al. | 370/338 |
| 2011/0237246 A1* | 9/2011 | Sen | 455/426.1 |
| 2012/0076045 A1* | 3/2012 | Pease et al. | 370/254 |
| 2012/0200688 A1* | 8/2012 | Endo et al. | 348/74 |

* cited by examiner

*Primary Examiner* — Thuong Nguyen
(74) *Attorney, Agent, or Firm* — Hewlett Packard Enterprise Patent Department

(57) ABSTRACT

When an access point (AP) is first powered up, it lacks provisioning information such as channel numbers, power levels, SSIDS, security settings, and so on. The process of supplying this information required to get the AP operating as part of a network is called provisioning. An unprovisioned AP in a swarm first attempts to obtain a DHCP address. Once it gets a DHCP address or selects an address such as from the link-address (169.254.xx.xx) group, it advertises a predetermined wireless SSID.

20 Claims, 1 Drawing Sheet

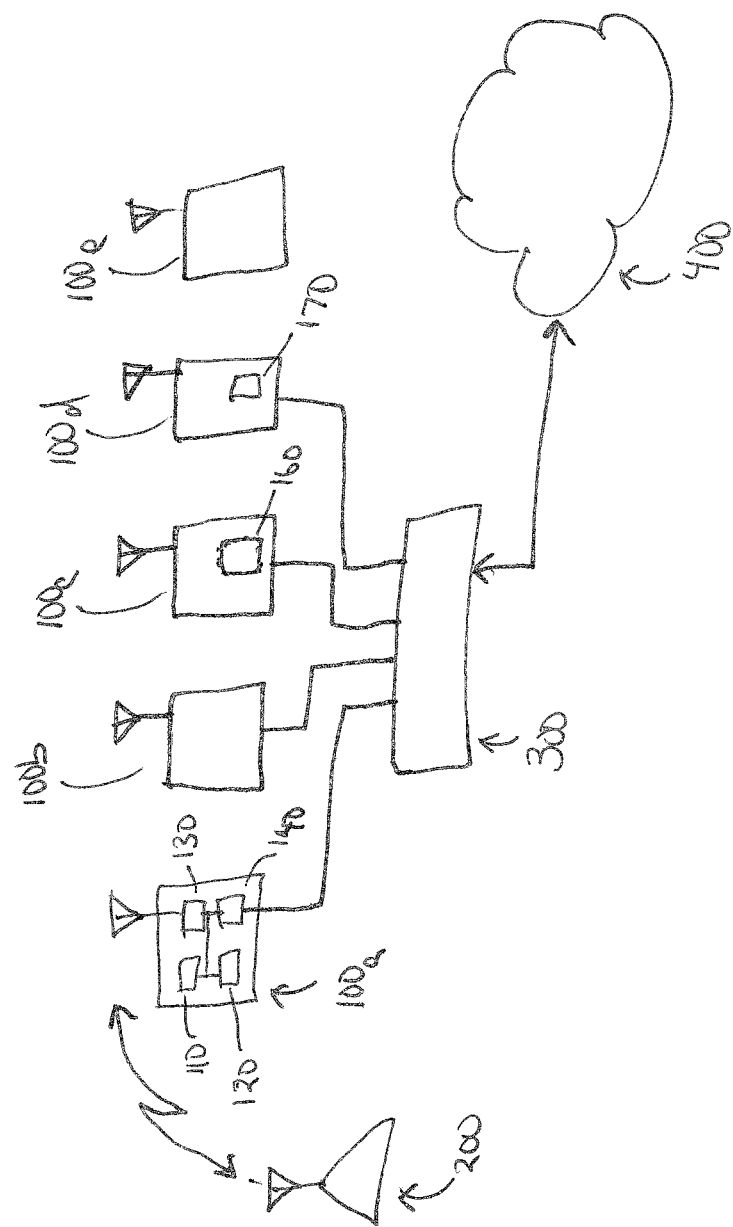

IDENTIFYING A WIRELESS COMMUNICATION CHANNEL AND A POWER SETTING FOR USE BY AN ACCESS POINT TO ADVERTISE A PARTICULAR SSID

NOTICE OF RELATED APPLICATION

This application is related to U.S. patent application Ser. No. 12/976,708, entitled "Providing and Resolving an IP Address for Swarm-Based Services" filed on Dec. 22, 2010, by Pradeep Iyer and Santashil PalChaudhuri, the disclosure of which is specifically incorporated herein by reference.

BACKGROUND OF THE INVENTION

The present invention relates to digital networks, and in particular, to the problem of provisioning digital devices in a swarm.

As used herein, a swarm is defined as a set of cooperating digital devices communicating over a digital network. One example of a swarm is a group of wireless access points (AP) providing wireless services to clients. Other examples of swarms are clusters of computers operating as a render farm, or other distributed computing tasks.

The composition of the swarm may change dynamically. As an example, APs may be added dynamically to a swarm, or may be removed from service.

When an AP is first powered up it starts in what is known as an unprovisioned state; it has not been provided with information such as operating channel, operating power levels, SSIDs, security settings, and possibly the regulatory domain the AP is operating in.

In a standalone AP such as those sold by Netgear, Linksys, Apple, and the like, the AP is set up to be provisioned over a wired Ethernet link. Such an AP initially powers up with a fixed IP address of 192.168.1.1, and is provisioned by making an HTTP connection to the AP with a web browser, authenticating with a presupplied username and password, and using the browser to provision the device and finally restart it. This provisioning scheme fails if the local network already has a device active at the fixed IP address the AP is configured to use, or may fail due to a number of other network configuration issues.

In provisioning a swarm of wireless access points, each AP obtains its address dynamically (DHCP). Some APs in the swarm may be mesh-based, having no wired connection. This simple provisioning model would seem to be inapplicable.

What is needed is a way to initially provision members of a swarm of wireless access points.

BRIEF DESCRIPTION OF THE DRAWINGS

The invention may be best understood by referring to the following description and accompanying drawings that are used to illustrate embodiments of the invention in which:

FIG. 1 shows wireless access points in a network operating as a swarm.

DETAILED DESCRIPTION

Embodiments of the invention relate to methods of provisioning wireless access points operating in a swarm.

According to the present invention, a swarm is a group of digital devices such as wireless access points (AP) connected to a digital network and operating in a cooperative manner. When a swarm AP starts up in an unprovisioned state, it first obtains an IP address using DHCP. Once the AP has an address, it searches for a Provisioning Master. If the AP does not locate a Provisioning Master, it elects itself as Provisioning Master. The process of selecting and electing a master for a service such as provisioning is fully described in the related application titled "Providing and Resolving an IP Address for Swarm-Based Services" and incorporated herein by reference. Locating or establishing the Provisioning Master provides the AP with the IP address of the Provisioning Master. The AP then configures its internal DHCP server with a nonconflicting scope. The AP advertises a predetermined wireless SSID which is only used for provisioning. When a wireless client associates with the SSID, the AP supplies it with an address from its DHCP server. Any HTTP request made by the client is NATed to the address of the Provisioning Master to complete provisioning.

The Provisioning Master process executes on one of the APs in the swarm. When it receives a connection from a wireless client, it supports the provisioning process. This process may include authentication and verification of licenses. Provisioning may be accomplished through a web-based utility provided by the Provisioning Master, through the wireless client providing configuration files or URLs to provisioning files, or a combination. The configuration may optionally be registered or validated through an external service. Once the configuration is complete, the Provisioning Master supplies the configuration to all members of the swarm, and swarm APs put the configuration into operation.

In one embodiment, unprovisioned swarm APs configures their wireless subsystems to only operate on the 2.4 GHz band on a channel and power level which is acceptable across all known regulatory domains. Currently, this is Channel 1 at a lowest power level.

FIG. 1 shows a network in which a swarm comprises a plurality of access points. Access points (APs) 100*a-e* are purpose-made digital devices, each containing a processor 110, memory hierarchy 120, and input-output interfaces 130. In one embodiment of the invention, a MIPS-class processor such as those from Cavium or RMI is used. Other suitable processors, such as those from Acorn, Intel, or AMD may also be used. The memory hierarchy 120 traditionally comprises fast read/write memory for holding processor data and instructions while operating, and nonvolatile memory such as EEPROM and/or Flash for storing files and system startup information. Wired interfaces 140 are typically IEEE 802.3 Ethernet interfaces, used for wired connections to other network devices such as switches, or to a controller. Wireless interfaces 130 may be WiMAX, 3G, 4G, and/or IEEE 802.11 wireless interfaces. In one embodiment of the invention, APs operate under control of a LINUX operating system, with purpose-built programs providing swarm and access point functionality. APs 100 may connect to a switch 300 which provides access to network 400. It should be noted that switch 300 does not have the capabilities of a controller, but only provides L2/L3 switching.

Wireless client device 200 has a similar architecture and for the purposes of provisioning may be a device such as a laptop or desktop computer with wired and/or wireless connectivity.

According to the present invention, a swarm is a group of digital devices connected to a network and operating cooperatively. As shown in FIG. 1, APs 100*a*-100*e* form a swarm, with APs 100*a*-100*d* having wired connections to switch 300, and AP 100*e* having only wireless connections to the other members 100*a*-100*d* of the swarm. Note that the network supporting the swarm may be a wired network, a wireless network, or a combination. In a preferred embodiment, the wireless network is an IEEE 802.11 Wireless network. In the example of FIG. 1, switch 300 provides access to network 400.

The present invention deals with provisioning swarm APs. At least one of the plurality of APs in the swarm has a wired Ethernet connection to a supporting network. In the example of FIG. 1, APs 100a-100d have wired connections through switch 300 to network 400. When a swarm AP powers up for the first time, it does not have provisioning information needed for operation, such as operating channel and power levels, SSID information, security configuration, and so on.

According to the invention, an unprovisioned swarm AP first attempts to obtain an IP address through DHCP. If DHCP is unsuccessful, the AP assigns itself a predetermined temporary IP address. The link local address range, 169.254.xx.xx is preferred for this use.

The AP then listens on a predetermined wireless channel for a broadcast message indicating the presence of a Provisioning Master. If the AP does not receive a broadcast message identifying a Provisioning Master within a predetermined period of time, it broadcasts a message electing itself as Provisioning Master and starts up the Provisioning process on the AP. If a Provisioning Master is already present the AP saves the address associated with the Provisioning Master.

While the AP hosting the Provisioning Master broadcasts a periodic heartbeat, all APs in the swarm advertise a predetermined SSID which is used only for provisioning. This SSID may be open, or may optionally require authentication.

In advertising this SSID wirelessly, the APs are by definition transmitting. Any such transmissions must be permitted by the appropriate regulatory domain in which the swarm AP is operating. Unfortunately, these swarm APs may not have been provisioned with the regulatory domain information. The unprovisioned swarm APs therefore only operate on a channel and power setting which is permitted across all regulatory domains. At the time this document was prepared, that is channel 1 on the 2.4 GHz band at a low power level.

The AP configures its internal DHCP server with a nonconflicting scope with relation to the address obtained in the initial DHCP step. A nonconflicting scope may be a block of addresses in the same group, or may be an address in a different group. As an example, if the address obtained in the initial DHCP step was 192.168.10.23, a nonconflicting scope for DHCP use would be 192.168.11.xx, or 10.1.1.xx. Devices associating with the AP will be assigned IP addresses from this nonconflicting scope.

It is useful to note that a number of the preparatory steps may be accomplished in different order than shown herein. As examples, while it is necessary for the AP to have started its local DHCP service before an address can be issued to a connecting client, and that the provisioning service be established before clients may be redirected to it, the timing of starting the DHCP service does not matter with respect to establishing the provisioning process, and so on.

It is important that all APs in the swarm use the same layer 3 address space so that layer 2 broadcast transmissions will reach all members of the swarm. An example of such a shared layer 3 IP address would be 192.168.1.0/24.

Since all APs in the swarm are advertising the same predetermined provisioning SSID, a client may associate with any member of the swarm to begin the provisioning process.

When a wireless client associates with the predetermined provisioning SSID, the client is assigned an IP address by the AP's DHCP server.

Any HTTP client requests are redirected to the Provisioning Master to complete the provisioning process. in one embodiment, the Provisioning Master presents a web page which supports the provisioning process. This may be implemented, by example, using a combination of the open source Apache web server and scripts written in php.

The Provisioning Master runs on one AP in the swarm. It is understood that all swarm APs contain the resources such as code and data to run the Provisioning process; these files are stored in memory hierarchy 120.

In its simplest state, applying the invention to a single AP, the AP starts up and begins broadcasting the predetermined provisioning SSID. The AP starts its DHCP service. The AP also starts a provisioning master process, and begins broadcasting the provisioning master heartbeat. When a client device connects to the AP through the predetermined provisioning SSID, the AP redirects the client to the web page provided by the provisioning process.

As multiple unprovisioned swam APs start up, one swarm AP is elected to host the Provisioning Master, for example AP 100c hosting the Provisioning Master as provisioning process 160. AP 100c begins broadcasting a periodic heartbeat advertising the provisioning service 160 hosted by AP 100c.

All unprovisioned swarm APs begin advertising the same predetermined provisioning SSID. When a client associates with that SSID on one of the swarm APs, the client is assigned an IP address. Optionally, that association may require authentication such as a set of security credentials, certificates, passwords, or the like. When the client makes an HTTP request, that request is redirected to the Provisioning Master to begin the provisioning process.

As shown in FIG. 1, client 200 associates with AP 100a and is assigned an IP address. When client 200 makes an HTTP request, that request is redirected by AP 100a to the provisioning master 160 hosted on AP 100c.

The provisioning process may be web-based and interactive, involving selecting options and filling in fields. The process may involve passing configuration files or the URLs to configuration files to the Provisioning process. Combinations may be used. Authentication may be required, such as providing a cryptographically-authenticated key to enable swarm operation or the operation of certain swarm features. The configuration when complete may be recorded, such as by sending the configuration to a predetermined remote site, or the configuration may optionally be passed to a remote site for verification. The configuration may also be digitally and/ or cryptographically signed.

The completed configuration is transferred to each AP in the swarm. This may be accomplished in a number of ways. The configuration may be broadcast to the swarm. A broadcast from the Provisioning Master may request each swarm AP to connect to the AP hosting the provisioning process and retrieve the configuration.

In one embodiment, each swarm AP periodically sends a heartbeat to the provisioning master. The provisioning master maintains a list of swarm members and sends unicast messages to each swarm member with configuration information.

When the configuration has been received and optionally verified by swarm APs, they begin operation using the configuration. One method of doing this is to restart the swarm AP so that on restart it uses the supplied configuration.

When the configuration has been distributed to all swarm members, the provisioning process may terminate, commanding the host AP to begin operation under the new configuration; the predetermined provisioning SSID and the Provisioning Master are no longer needed.

When a new network has been created and is operational and no clients are connected to provisioning network, it is automatically removed by the swarm master.

Provisions must be made for mesh points, defined as those APs such as AP 100*e* which do not have wired connections shared with other APs. Those APs with wired connections to a network are known as mesh portals.

According to one embodiment of the invention, every mesh portal in the swarm advertises a hidden SSID with a Virtual Controller MAC Address as the unique identifier. When an unprovisioned mesh point such as AP 100*e* comes into the network, it tries to discover a provisioning WLAN. If the unprovisioned mesh AP sees one and only one Virtual Controller being advertised, it connects to it automatically using factory default credentials such as a preshared key (PSK). Once this connection is successful, the unprovisioned mesh AP gets an IP Address from the network and joins in the normal master election algorithm. If multiple Virtual Controllers are seen, the unprovisioned mesh AP stops the provisioning process as it does not know which network to connect to. In this case the unprovisioned mesh AP must be connected to a wired port shared with the desired swarm network. The unprovisioned AP then joins the network, receiving provisioning information and then is able to join the correct virtual network on WiFi. The now provisioned AP may be powered down, disconnected from the wired network, and repowered where it will join the swarm as a mesh point.

The present invention may be realized in hardware, software, or a combination of hardware and software. The present invention may be realized in a centralized fashion in one computer system such as AP 100, or in a distributed fashion where different elements are spread across several interconnected computer systems. A typical combination of hardware and software may be an access point with a computer program that, when being loaded and executed, controls the device such that it carries out the methods described herein.

The present invention also may be embedded in nontransitory fashion in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

We claim:

1. A non-transitory Computer Readable Medium (CRM) comprising instructions which, when executed by one or more hardware processors, causes performance of operations comprising:
 determining, by an access point, that a regulatory domain is not configured for the access point;
 responsive to determining that the regulatory domain is not configured for the access point:
  identifying, by the access point, a wireless communication channel and a power setting that are (a) permitted for wireless operation in all regulatory domains as defined by IEEE 802.11 standards and (b) for use in advertising a particular SSID by the access point; and
 advertising, by the access point, the particular SSID at the identified power setting on the identified wireless communication channel that is permitted for wireless operation in all regulatory domains as defined by IEEE 802.11 standards.

2. The CRM of claim 1, wherein the wireless communication channel comprises channel 1 on a 2.4 GHz wireless communication band.

3. The CRM of claim 1, wherein the operations further comprise:
 executing, by the access point, a Dynamic Host Configuration Protocol (DHCP) server;
 configuring the DHCP server with an address scope that is non-conflicting with an IP address associated with the access point.

4. The CRM of claim 3, wherein the operations further comprise:
 receiving, by the access point, a connection request from a client;
 assigning, by the access point, to the client an address within the address scope; and
 redirecting, by the access point, an Hypertext Transfer Protocol (HTTP) request from the client to a provisioning service.

5. The CRM of claim 4, wherein redirecting the HTTP request comprises:
 redirecting, by the access point, the HTTP request to another access point in the group of access points, wherein the other access point is a provisioning device.

6. The CRM of claim 4, wherein the operations further comprise:
 receiving, by the access point, configuration information from the provisioning service;
 configuring the access point based on the configuration information.

7. The CRM of claim 6, wherein the configuration information comprises at least one new SSID that is different from the particular SSID.

8. The CRM of claim 1, wherein the access point uses the particular SSID only for a provisioning process.

9. The CRM of claim 1, wherein the operations further comprise the access point advertising a second SSID different than the particular SSID after a provisioning process for the access point is completed.

10. The CRM of claim 1, wherein the operations further comprise:
 determining, by the access point, a number of virtual controllers that are detected by the access point;
 responsive to the access point detecting a single virtual controller: requesting, by the access point, provisioning information from the single virtual controller;
 responsive to the access point detecting two or more virtual controllers, refraining, by the access point, from requesting provisioning information from any of the two or more virtual controllers.

11. An access point comprising:
 a hardware processor;
 the access point configured for performing operations comprising:
  determining that a regulatory domain is not configured for the access point;
  responsive to determining that the regulatory domain is not configured for the access point: identifying a wireless communication channel and a power setting that are (a) permitted for wireless operation in all regulatory domains as defined by IEEE 802.11 standards and (b) for use in advertising a particular SSID by the access point; and advertising the particular SSID at the identified power setting on the identified wireless communication channel that is permitted for wireless operation in all regulatory domains as defined by IEEE 802.11 standards.

12. The access point of claim 11, wherein the wireless communication channel comprises channel 1 on a 2.4 GHz wireless communication band.

13. The access point of claim 11, wherein the operations further comprise:
   executing a Dynamic Host Configuration Protocol (DHCP) server;
   configuring the DHCP server with an address scope that is non-conflicting with an IP address associated with the access point.

14. The access point of claim 13, wherein the operations further comprise:
   receiving a connection request from a client;
   assigning to the client an address within the address scope; and
   redirecting an Hypertext Transfer Protocol (HTTP) request from the client to a provisioning service.

15. The access point of claim 14, wherein redirecting the HTTP request comprises:
   redirecting the HTTP request to another access point in the group of access points, wherein the other access point is a provisioning device.

16. The access point of claim 14, wherein the operations further comprise:
   receiving configuration information from the provisioning service;
   configuring the access point based on the configuration information.

17. The access point of claim 16, wherein the configuration information comprises at least one new SSID that is different from the particular SSID.

18. The access point of claim 11, wherein the access point uses the particular SSID only for a provisioning process.

19. The access point of claim 11, wherein the operations further comprise the access point advertising a second SSID different than the particular SSID after a provisioning process for the access point is completed.

20. The access point of claim 1, wherein the operations further comprise:
   determining a number of virtual controllers that are detected by the access point;
   responsive to the access point detecting a single virtual controller: requesting provisioning information from the single virtual controller;
   responsive to the access point detecting two or more virtual controllers, refraining from requesting provisioning information from any of the two or more virtual controllers.

* * * * *